United States Patent [19]

Yabu et al.

[11] 3,826,447

[45] July 30, 1974

[54] AUTOMATIC TAPE THREADING MECHANISM

[75] Inventors: Toshiomi Yabu; Hideki Sakumoto; Yoshiteru Namoto, all of Osaka, Japan

[73] Assignee: Matsushita Electric Industrial Company, Limited, Kadoma City, Osaka, Japan

[22] Filed: Dec. 1, 1972

[21] Appl. No.: 311,377

[30] Foreign Application Priority Data

| | | |
|---|---|---|
| Dec. 1, 1971 | Japan | 46-97361 |
| Dec. 1, 1971 | Japan | 46-97363 |
| Dec. 1, 1971 | Japan | 46-97379 |
| Dec. 1, 1971 | Japan | 46-97380 |
| Dec. 27, 1971 | Japan | 47-595 |
| Dec. 27, 1971 | Japan | 47-596 |

[52] U.S. Cl. .......... 242/188, 226/91

[51] Int. Cl. ..... B65h 59/38, G03b 1/04, G11b 1/52

[58] Field of Search ........ 242/188, 195; 226/90, 91; 352/157, 158

[56] References Cited

UNITED STATES PATENTS

| | | | |
|---|---|---|---|
| 3,379,387 | 4/1968 | Takahashi et al. | 242/195 |
| 3,473,042 | 10/1969 | Orlando | 307/118 |
| 3,643,889 | 2/1972 | Krause | 242/182 |

*Primary Examiner*—Leonard D. Christian

[57] ABSTRACT

Means for detecting an accidental stoppage of a lead tape attached to one end of a reel of recording tape while the lead tape is advanced from the supply reel, through a circular arc shaped guide member, to the take-up reel. The detecting means comprises a first circuit for detecting the movement and stoppage of the lead tape, a second circuit for detecting the feed of the lead tape drawn from the supply reel, and switching means selectively operated in a predetermined sequence in response to the first and second circuits for de-energizing the tape drive when a stoppage of the lead tape is detected.

4 Claims, 25 Drawing Figures

AUTOMATIC TAPE THREADING MECHANISM

This invention relates generally to a video taperecorder, and particularly to an improved automatic tape threading mechanism of a video tape-recorder, and more particularly to means for detecting an accidental stoppage of a lead tape attached to one end of the recording tape and for de-energizing the tape drive means.

An automatic tape threading mechanism of a video tape-recorder is already known in the art. In an automatic tape threading mechanism a lead tape about 100cm long is usually attached to one end of the recording tape and normally retracted in a cartridge. When the lead tape is fed from the cartridge, it follows a circular path guided by a circular arc shaped guide member disposed circularly of a head drum and taken up by a take-up reel. While advancing through the guide member, the lead tape develops friction between the tape and the inner wall of the guide member. Since the lead tape is made of a rather stiff material, it usually proceeds withstanding the friction. However, frequent use of such a tape would cause fatigue in the material, which would lead to a fracture of the tape, causing the lead tape to stop. On the other hand, the take-up reel is also a potential source of failure in the threading operation. The lead tape is taken up by engagement between the periphery of the hub and a free end of an arm pivoted at the intermediate thereof with biasing means attached to the other end to provide a force urging the free end against the hub periphery. With this arrangement, there is a possibility that the lead tape fails to be threaded between the above-mentioned members due to lack of sufficient frictional force. In such cases, the recording tape would be slackened and sometimes entangled to the extent of complete damage of a reel of tape.

In a prior art device, a timing circuit is provided to terminate a threading operation when a predetermined time has elapsed. Although this has an effect of avoiding a complete damage of a reel of tape when a threading failure is encountered, impairment of the recorded material is inevitable. Furthermore, during a threading operation the lead tape is moved at a speed faster than the normal average speed for recording or playback operation, it is very likely that an accidental stoppage of the lead tape would occur.

It is therefore an object of the present invention to provide an improved automatic tape threading mechanism of a video tape-recorder.

A further object of the present invention is to provide means for detecting an accidental stoppage of a lead tape attached to one end of a reel of video recording tape to prevent impairment of the material recorded on the tape.

These and other objects of the present invention will be more clearly understood by the following description taken in conjunction with the accompanying drawings, in which.

Briefly stated, the present invention provides a photoelectrical device for detecting movement and stoppage of the lead tape fed from the cartridge or supply reel, through a circular arc shaped guide member, to the take-up reel. The photoelectrical device comprises a light source for providing a light beam, a light sensitive element such as photocell disposed in opposed relation to the light source and an integrating or accumulative circuit. The lead tape comprises transparent or light-reflective portions arranged alternately with opaque or non-reflective portions. As the lead tape is fed from the supply reel, it transverses the light beam and the opaque portions of the tape interrupts the beam, producing a train of pulses at the photocell. The train of pulses is integrated or converted into a continuous signal by the integrating circuit. The photoelectrical device further comprises a detecting circuit for detecting the feed of the lead tape from the supply reel. The device further comprises a switching circuit selectively operated in a predetermined sequence in response to signals from the integrating circuit and the detecting circuit for completing a circuit for de-energizing the tape drive means.

Figure 1:
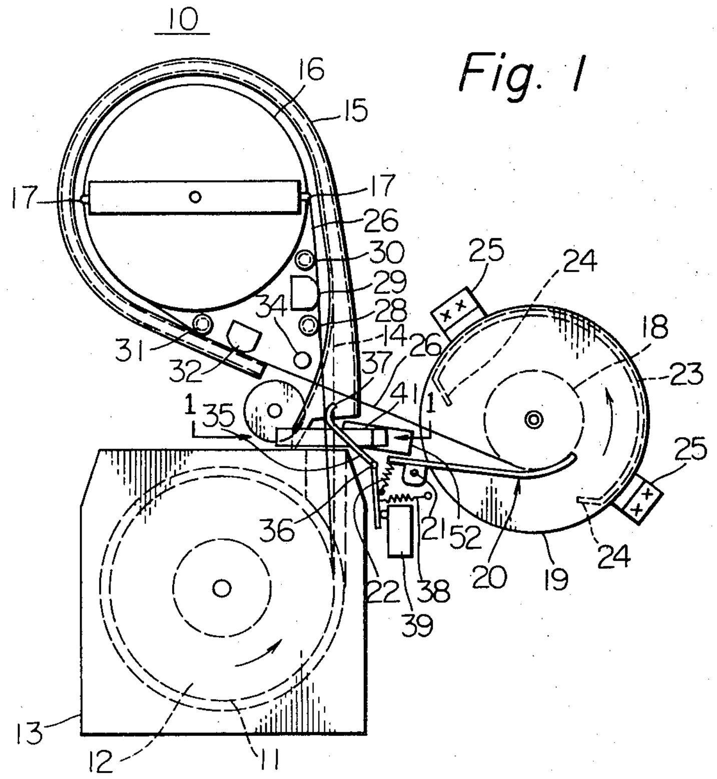
FIG. 1 is a schematic plan view of a magnetic video tape-recorder showing a first preferred embodiment of the present invention, with a lead tape taken up around the hob of the take-up reel.
Figure 2:
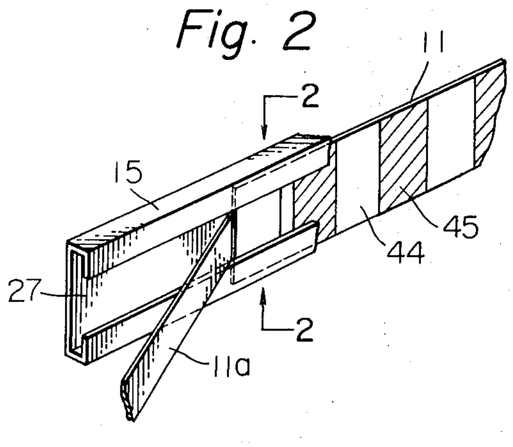
FIG. 2 is a fragmentary perspective view of a guide member with a lead tape inserted into the guide member, the lead tape having transparent square portions arranged alternately with opaque portions.
Figure 3:
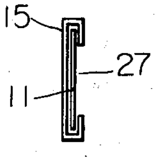
FIG. 3 is a cross-sectional view of the guide member with the lead tape inserted therein, taken along line 2—2 of FIG. 2.

Reference is made to the drawings wherein like numerals indicate like parts throughout. In FIGS. 1 through 8 there is shown a first preferred embodiment of the present invention. The numeral 10 generally indicates a video tape-player of a tape-recorder. In the normal retracted position a lead tape 11 of a rather stiff rigid material attached to one end of a reel of recording tape 11a is wound around a supply reel 12 contained in a cartridge 13. When the lead tape 11 is fed from the supply reel 12 by a tape drive means (not shown), the lead tape follows a path as shown in broken lines 14, advances through a circular arc shaped guide member 15 disposed circularly of a head drum 16 having two heads 17 spaced angularly 180° apart, and proceeds toward the periphery of a hub 18 of a take-up reel 19. The lead tape 11 is taken up by engagement between the hub 18 and a free end of an arm 20 pivoted at the intermediate portion thereof on a spindle 21 with a spring 22 attached to the other end to provide a force urging the free end against the periphery of the hub 18. To the other end of the arm 20 is attached a normally closed contact or break contact 52. Due to the stiffness of the material, the lead tape 11 follows a rather straight path after engagement with hub 18 and strikes against the inner wall of an arcuate guide 23 disposed in the periphery of the take-up reel 19 substantially in opposed relation to the point of engagement of the tape with the hub periphery. The arcuate guide 23 has a pair of inwardly flared portions 24 and supported by a pair of support members 25 so that the center axis of the arcuate guide 23 is in coincident with the axis of the hug 18. The lead tape is guided along the inner wall of the arcuate guide 23 and bent inwardly as it bumps against the flared portion 24 and advances for reengagement between the following portion of the lead tape and the periphery of the hub 18 of the take-up reel. After reengagement with the hub, the lead tape is taken up by the take-up reel. As the lead tape is taken up by the take-up reel, the free end of the arm 20 moves outwardly and causes the break contact 52 to open. The guide member 15 has a C-shaped cross-section as shown in FIG. 3 with a longitudinal aperture 27 facing the periphery of the head drum 16, the width of the aperture being smaller than that of the lead tape 11 and larger than that of the recording tape 11*a*. Therefore, the recording tape 11*a* follows a path inner than the lead tape. The recording tape runs past a bin 28, past an erase head 29, past a bin 30, is taken up by the head drum 16, runs past a bin 31 and past an audio-control head 32 and to the take-up reel 19. When the recorder is put into a recording or playback condition, a pinch roller 33 is brought into a position urging the recording tape 11*a* against a capstan 34.

Figures 4, 5, 6:
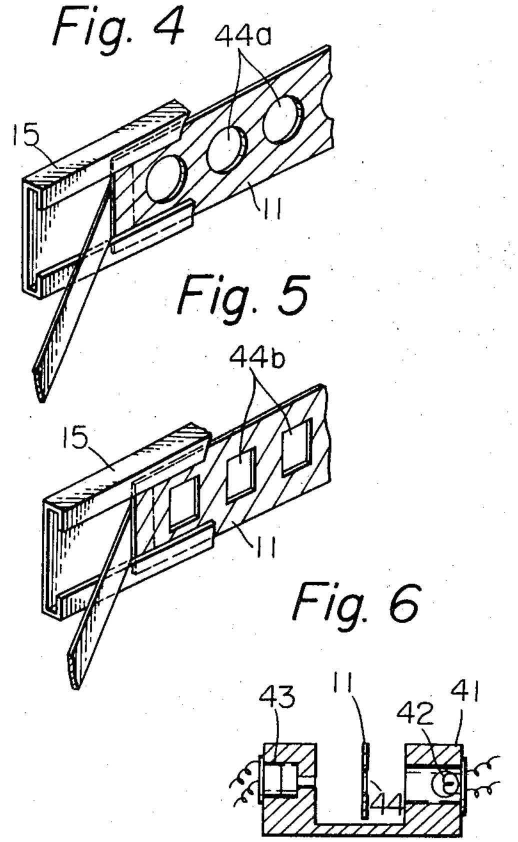
FIG. 4 is a fragmentary perspective view of a guide member with a lead tape inserted into the guide member, the lead tape having transparent circular portions arranged at predetermined spacings therebetween.
FIG. 5 is a fragmentary perspective view of a guide member with a lead tape inserted in the guide member, the lead tape having transparent square portions arranged at predetermined spacings therebetween.
FIG. 6 is a cross-sectional view of a photodetector of the first preferred embodiment of the present invention, the photodetector having a photocell and a light source arranged in opposed relation to each other with the lead tape disposed therebetween, taken along line 1—1 of FIG. 1.
Figure 7:
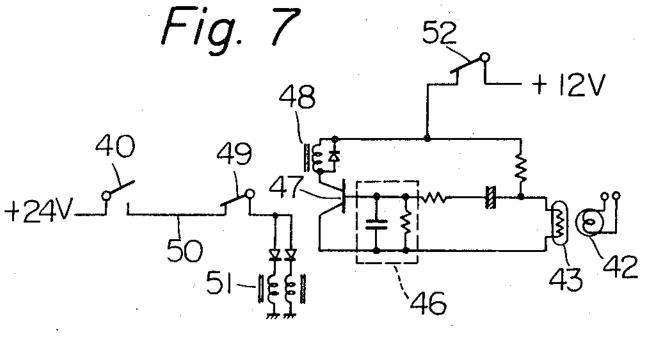
FIG. 7 is a circuit diagram of a detecting circuit of the first preferred embodiment of the invention.
Figure 8:
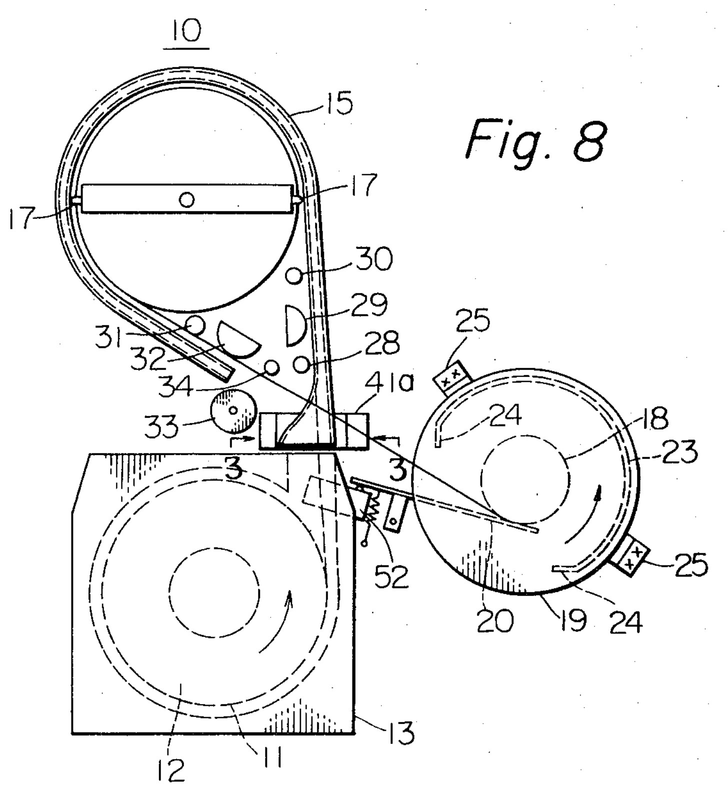
FIG. 8 is a schematic plan view of a magnetic video tape-recorder showing a second preferred embodiment of the present invention, with a lead tape taken up around the hub of the take-up reel.
Figure 9:
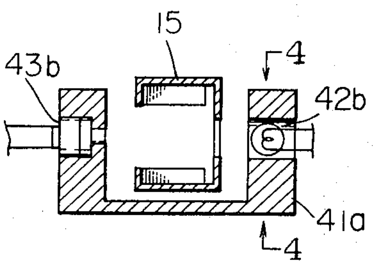
FIG. 9 is a cross-sectional view of a photodetector of the second embodiment of the invention, with the guide member disposed therein, taken along line 3—3 of FIG. 8.
Figure 10:
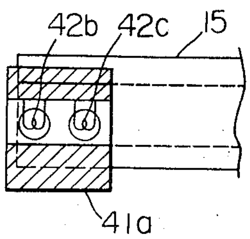
FIG. 10 is a cross-sectional view of the photodetector of FIG. 9, taken along line 4—4 of FIG. 9.
Figure 11:
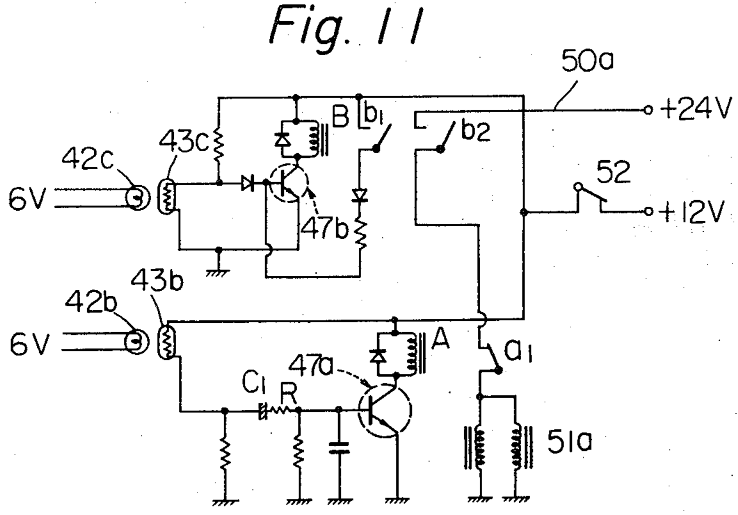
FIG. 11 is a circuit diagram of a detecting curcuit of the second preferred embodiment of the invention.

In the first embodiment of the present invention there is provided adjacent the aperture of the cartridge 13 a lever 35 pivotally connected to a pivot 36 at the intermediate portion thereof and having at one end an arcuate portion 37 traversing the passage of lead tape 11 with a spring member 38 connected to the other end thereof. In the normal position the lever 35 is in contact with a switch 39 adjacent thereto having therein a make contact 40 placed in the circuit of FIG. 7. Also provided is a photodetector 41 disposed between the aperture of the cartridge 13 and the inlet end of the guide member 15. The photodetector 41 comprises a light source 42 and a light sensitive element or photocell 43 disposed in opposed relation thereto so that a light beam emitted from the source 42 transverses the passage of the lead tape 11 (FIG. 6). When the supply reel is rotated counterclockwise by the tape drive means, the lead tape is driven from the aperture of the cartridge 13 and pushes the arcuate end portion 37 of the lever 35 away from the normal position, closing contact 40 contained in a switch 39. As seen from FIG. 2 the lead tape 11 has transparent portions 44 arranged alternately with opaque portions 45. As the lead tape 11 runs past the photodetector 41, the light beam is interrupted by the opaque portions 45 of the lead tape and a corresponding train of electrical pulses is generated at the photocell 43. The train of pulses then passes through an integrating circuit 46 which converts the pulses into a continuous signal, renders a transistor 47 conductive and energizes relay means 48 connected in series with the transistor 47, opening its contact 49. If, in this instance, the lead tape accidentally stops advancing, the relay means 48 will become inoperative restoring the contact 49 to a normally-closed position, thereby completing a circuit 50 for solenoid 51. The solenoid 51 is operated to de-energize the tape feeding means. After the lead tape 11 has been taken up by the take-up reel, the contact 52 is opened to de-energize the circuit of FIG. 7, releasing the relay 48 thus closing its contact 49, and the solenoid 51 is operated to de-energize the tape drive means to terminate the tape threading operation. In FIGS. 4 and 5 examples of the lead tape 11 are shown and comprise circular and square shaped transparent or light-reflective portions 44a and 44b arranged at predetermined spacings along an opaque material 11.

Figure 12:
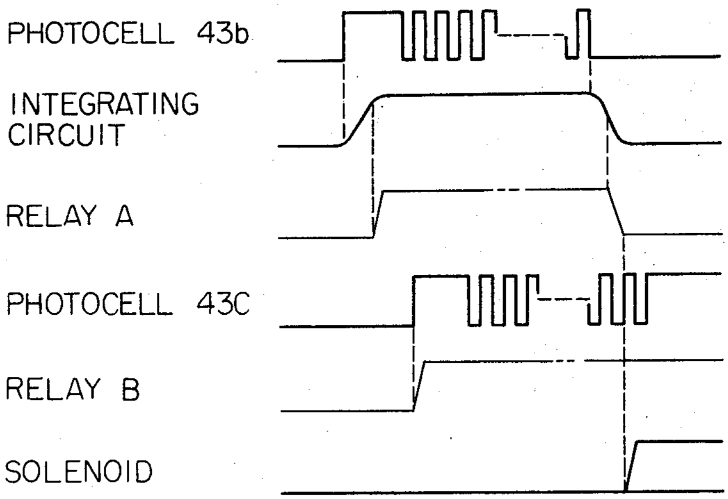
FIG. 12 is an operating diagram of the circuit of FIG. 11.

Referring to FIGS. 8 to 12 there is shown a second preferred embodiment of the invention. A photodetector 41a is disposed adjacent the aperture of the cartridge 13. The photodetector 41a comprises a light source 42b adjacent the cartridge 13 and a light source 42c arranged remote from the cartridge, both along the passage of the lead tape 11. The photodetector further includes light sensitive elements or photocells 43b and 43c arranged in opposed relation to the light sources 42*b* and 42*c* with the guide member 15 disposed therebetween. When the lead tape is fed from the cartridge 13 it first runs past the light source 42*b*, and generates a first train of pulses at the photocell 43*b*. These pulses pass through an RC Network comprising a smoothing capacitor $C_1$ and a resistor R to produce a continuous signal as shown in FIG. 12. As the signal level of the continuous signal rises to a sufficient magnitude, a transistor 47*a* is rendered conductive to energize a relay A which in turn causes its break contact $a_1$ to open. As the lead tape proceeds to the light beam from the light source 43*c*, a second train of pulses is produced at the photocell 43*c*. With the first pulse supplied, a transistor 47*b* is rendered conductive and a relay B is energized to close make contacts $b_1$ and $b_2$. It is to be noted that a sufficient elapse of time is ensured between the instant the relay A is energized and the instant the relay B is energized, so that a solenoid 51*a* is not operated erroneously. When the lead tape 11 accidentally stops advancing, the first train of pulses will disappear and release the relay A, closing its breaker contact $a_1$.

Since the relay B is held energized at its contact $b_1$, the release of the relay A completes a circuit 50*a* for the solenoid 51*a*, which de-energizes the tape drive means. When the lead tape has been taken up successfully by the take-up reel the switch contact 52 is opened for de-energizing the relay A, closing its contact $a_1$ to energize the solenoid 51*a*.

Figure 13A:
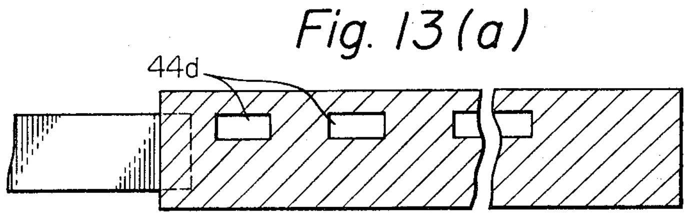
FIG. 13(a) is a fragmentary plan view of a lead tape attached to one end of a recording tape, showing a third preferred embodiment of the invention, the lead tape having therein square transparent portions arranged at predetermined spacings therebetween along one side of the tape.
Figure 13B:
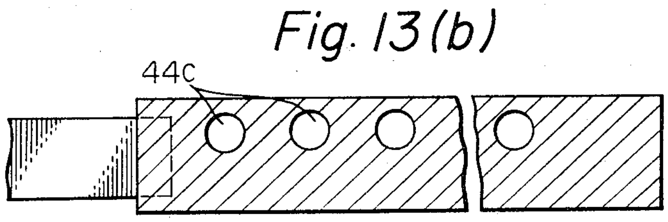
FIG. 13(b) is a fragmentary plan view of a lead tape attached to one end of a recording tape, showing the third preferred embodiment of the invention, the lead tape having therein circular transparent portions arranged at predetermined spacings therebetween along one side of the tape.
Figure 14:
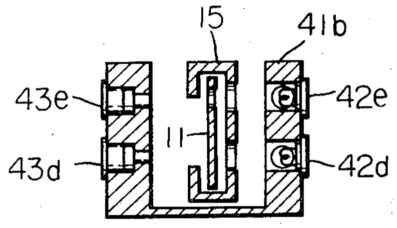
FIG. 14 is a cross-sectional view of a photodetector of the third preferred embodiment of the invention, with a pair of light sources and a pair of photocells in opposed relation to each other and the guide member disposed therebetween.
Figure 15:
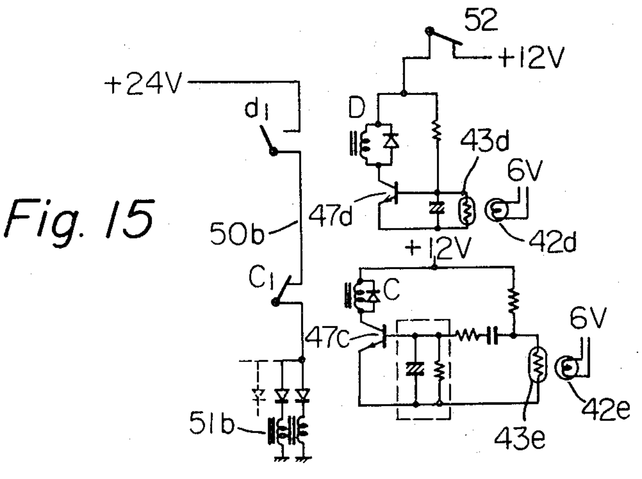
FIG. 15 is a circuit diagram of the third preferred embodiment of the present invention.

Referring to FIGS. 13 to 15 there is shown a third preferred embodiment of the invention. In this embodiment, a lead tape 11 comprises transparent portions arranged at predetermined spacings therebetween along one side of the tape with a stretch of a continuous opaque portion along the other side. The lead tape 11 may be provided with either rectangular transparent portions 44*c* or circular transparent portions 44*d*. A photodetector 41*b* comprises light sources 42*d* and 42*e* arranged vertically one upon the other and photocells 43*d* and 43*e* arranged in opposed relation to the light sources 42*d* and 42*e* with a guide member 15 disposed therebetween (FIG. 14). As in the previous embodiments the photodetector 41*b* is arranged arranged adjacent the aperture of the cartridge 13. When the lead tape 11 is fed out from the supply reel 13, it runs past the light source 42*d* and 42*e* simultaneously. At the output of the photocell 43*e* there is produced a first pulse of a predetermined duration which, after passing through an RC network of FIG. 15, is supplied to the base of a transistor 47*c*, which is rendered conductive. The conduction of the transistor 47*c* results in the energization of a relay C, opening a break contact $c_1$. Concurrently, a pulse of the same duration is supplied to the base of a transistor 47*d*, which, likewise, is rendered conductive, energiging a relay D connected to the collector of the transistor, thus closing a make contact $d_1$. While the lead tape proceeds moving along its path, a train of pulses is generated at the photocell 43*e*, and these pulses are integrated by an RC network and the transistor 47*C* is kept conductive. On the other hand, a continuous signal is generated at the photocell 43*d* since it is so arranged as to face the continuous opaque stretch portion of the lead tape 11, so that the relay D is held energized once the lead tape has been fed out from the supply reel 13. Upon failure of the forward movement of the lead tepe, the train of pulses at the photocell 43*e* disappears and the relay C is de-energized, restoring its break contact $c_1$ to the normal position. Because the relay D is kept energized, a circuit 50*b* is thus completed and a solenoid 51*b* is operated to de-energize the tape drive means.

Figure 16:
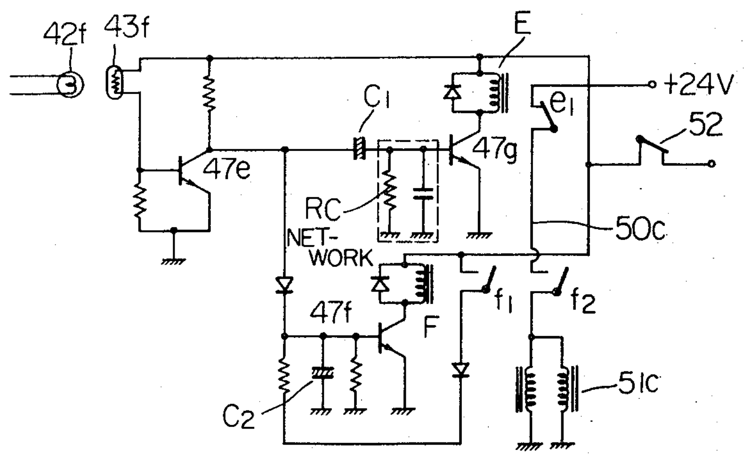
FIG. 16 is a circuit diagram of a fourth preferred embodiment of the present invention.
Figure 17:
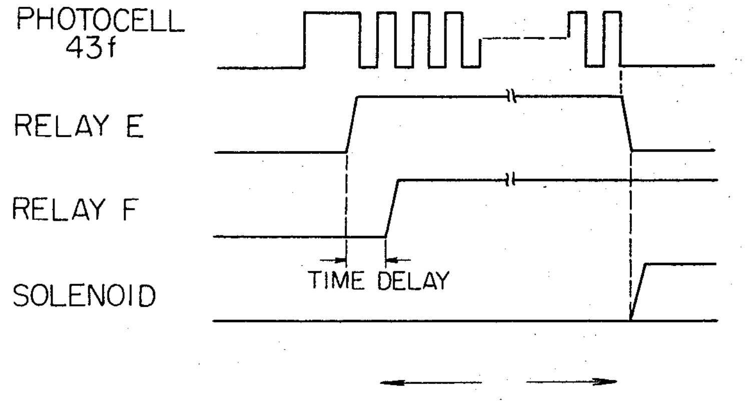
FIG. 17 is an operating diagram of the circuit of FIG. 16.
Figure 18:
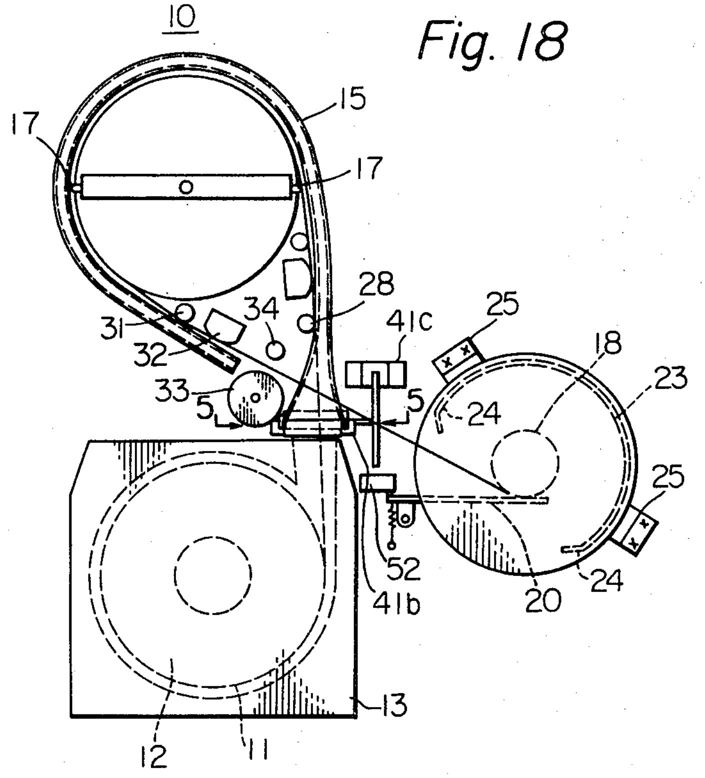
FIG. 18 is a schematic plan view of a magnetic video tape-recorder showing a fifth preferred embodiment of the present invention with a lead tape taken up by the take-up reel.
Figure 19:
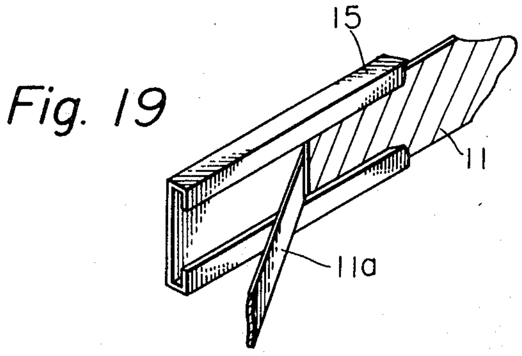
FIG. 19 is a fragmentary perspective view of a guide member with an opaque lead tape inserted therein.
Figure 20:
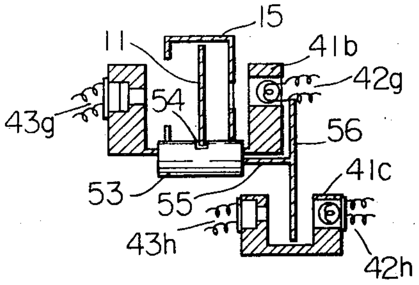
FIG. 20 is a cross-sectional view of a photodetector of the fifth preferred embodiment of the invention, taken along line 4—4 of FIG. 18.
Figure 21:
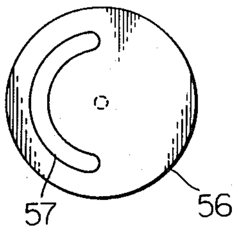
FIG. 21 is a side elevational view of a disc of FIG. 20, having an arcuate aperture therein.

Reference is now made to FIGS. 16 to 17 wherein a fourth embodiment of the present invention is shown. FIG. 16 shows a photodetecting circuit which includes only one light source 42*f* and one photocell 43*f* to serve the purposes of detecting the movement and stoppage of the lead tape 11 and of memorizing a condition that the tape is fed out from the supply reel 13. As the lead tape runs past the photocell 43*f*, it generates a train of pulses, as shown in FIG. 17. The first pulse is of longer duration and renders a transistor 47*e* conductive and the photocell 43*f* via a capacitor $C_1$ renders a transistor 47*g* conductive and energizes a relay E, opening a break contact $e_1$. Concurrently, the same pulse is supplied to the emitter of a transistor 47*f*. In this case, a capacitor $C_2$ absorbs the first pulse, discharges it after a predetermined elapse of time, and then renders the transistor 47*f* conductive energizing a relay F, and closing a contact $f_1$ to form a hold circuit and closing a contact $f_2$ to prepare for a circuit 50*c* for a solenoid 51*c* to be completed. Therefore, the relay F is set to be energized after the energization of the relay E so as to prevent the energizing circuit 50*c* from completing due to erroneously delayed energization of the relay E. While the lead tape proceeds, a train of pulses is produced in the same manner as described in the foregoing, and these pulses are integrated by an RC network to form a continuous signal, which holds the transistor 47g conductive and thus the relay E energized. If the lead tape is caused to stop movement, the train of pulses disappears and the relay E will be restored to the normal condition, closing the contact $e_1$, thus completing the circuit 50*c* for the solenoid 51*c* de-energizing the tape drive means connected with the supply reel 12.

Referring now to FIGS. 18 to 24 there is shown a fifth embodiment of the invention in which a lead tape of the conventional opaque type is used. A first light source 42*g* is disposed adjacent the side wall of the inlet portion of the guide member 15. In opposed relation to the light source 42*g* is disposed a photocell 43*g* facing the other side wall of the inlet portion of the guide member 15. Between the aperture of the cartridge 13 and the inlet end of the guide member there is provided a drum 53 having preferably an annular slot 54 or frictional surface thereon. The drum 53 is rotatably supported on a suitable support (not shown) and via a spindle 55 connected to a disc 56 having therein an arcuate transparent portion 57. A second light source 42*h* is arranged to face the disc 56 at a spacing therefrom and a second photocell 43*h* in opposed relation to the light source 42h facing the opposite surface of the disc 56. The lead tape, when fed from the supply reel, rides on the slot 54. As it proceeds, the drum 53 is caused to rotate about its axis due to the friction between the lower edge of the lead tape and the slot 54. The rotation of the drum 53 results in rotation of the disc 56, and an electrical pulse is produced at the photocell 43*h* when the light beam from the light source 42*h* is being interrupted by the opaque portion of the disc 56. As the disc continues to rotate, a train of pulses is produced, which renders a transistor 47*h* conductive, energizing a relay H causing a break contact $h_1$ to open. Concurrently, a relay G is energized when the lead tape runs past the photocell 43*g* and maintains energization on account of the continued interruption by the lead tape of the light beam. If, in this instance, the lead tape is accidentally caused to stop from proceeding, the train of pulses will disappear and the relay H will be released, closing the contact $h_1$ and completing a circuit 50*d* for the solenoid 51*d*.

Figure 22:
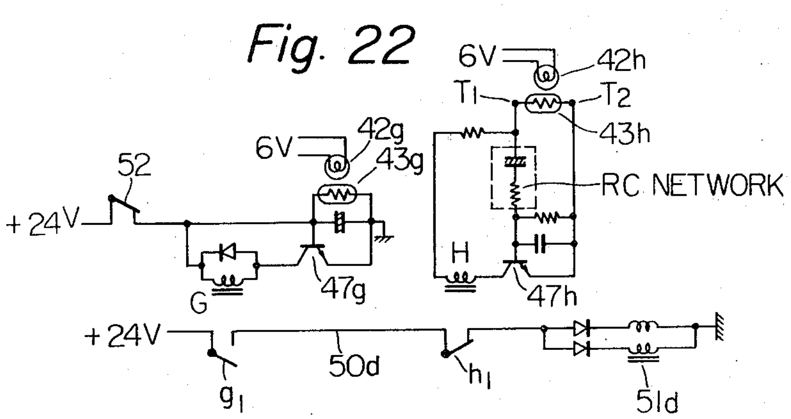
FIG. 22 is a circuit diagram of a photodetecting circuit of the fifth preferred embodiment of the invention.
Figure 23:
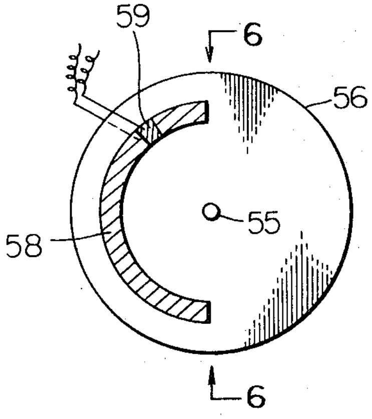
FIG. 23 is a side elevational view of a disc of FIG. 20, having two arcuate metal plates attached on the surfaces thereof, one on each side.
Figure 24:
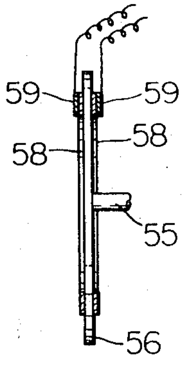
FIG. 24 is a cross-sectional view of the disc of FIG. 23, taken along line 5—5 of FIG. 23.

Another example is shown in FIGS. 23 to 24 wherein the disc 56 has a pair of arcuate metal strips 58 attached to the surface thereof. Two brushes 59 are provided in contact with the metal strips 58, the brushes being connected to terminals $T_1$ and $T_2$ in place of the photocell 43*h* (FIG. 22). By rotation of the disc 56 a train of pulses is generated at the terminals and the same object is achieved as described above.

The foregoing description has been concerned with only a few examples and various other modifications are also possible. For instance, instead of a conventional relay having a self-holding contact as disclosed in the specification, a mechanical latching relay or a magnetic latching relay may be used. If light-reflective portions are arranged instead of arranging transparent portions, the photocell and the light source are arranged side by side parallel to the passage of the lead tape.

Therefore, other variations or modifications of the present invention will be apparent to those skilled in the art without departing from the scope of the invention. The scope of the invention is therefore to be determined solely by the appended claims, not by the disclosed embodiments.

What is claimed is:

1. In a video tape-recorder having a supply reel, takeup reel, means for driving said supply reel and a lead tape attached to one end of a reel of recording tape wound on said supply reel, a device for detecting an acidental stoppage of the lead tape and for de-energizing the drive means, comprising:

a. a light source;
b. a light sensitive element arranged in opposed relation to said light source for generating a train of pulses;
c. a circuit for integrating said pulses to produce a first signal;
d. means for detecting the feed of said lead tape from said supply reel and producing a second signal; and
e. switching means selectively operated in a predetermined sequence in response to said first and second signals whereby said drive means is de-energized when said accidental stoppage of said lead tape is detected.

2. In a video tape-recorder having a supply reel, a take-up reel, means for driving said supply reel and a lead tape attached to one end of a reel of recording tape wound on said supply reel, a device for detecting an accidental stoppage of the lead tape and for de-energizing the drive means, comprising:

a. a drum having an annular slot thereon in contact with one edge of said lead tape and rotatable about the center thereof;
b. a disc having a spindle at the central portion thereof and a transparent portion therein, said spindle being connected to the center of said drum;
c. a light source facing the surface of said disc;
d. a light sensitive element arranged in opposed relation to said light source for generating a train of pulses;
e. a circuit for integrating said pulses to produce a first signal;
f. means for detecting the feed of said lead tape from said supply reel and producing a second signal; and
g. switching means selectively operated in a predetermined sequence in response to said first and second signals whereby said drive means is de-energized when said accidental stoppage of said lead tape is detected.

3. In a video tape-recorder having a supply reel, a take-up reel, means for driving said supply reel and a lead tape attached to one end of a reel of recording tape wound on said supply reel, a device for detecting an accidental stoppage of the lead tape and for de-energizing the drive means, comprising:

a. a drum having an annular slot thereon in contact with one edge of said lead tape and rotatable about the center thereof;
b. a disc having a spindle at the central portion thereof and a pair of metal strips on opposite surfaces thereof, said spindle being connected to the center of said drum; and
c. a pair of brushes in opposed relation to each other and in contact with said metal strips for generating a train of pulses;
d. a circuit for integrating said pulses to produce a first signal;
e. means for detecting the feed of said lead tape from said supply reel to produce a second signal; and
f. switching means selectively operated in a predetermined sequence in response to said first and second signals whereby said drive means is de-energized when said accidental stoppage of said lead tape is detected.

4. In a video tape-recorder having a supply reel, a take-up reel, means for driving said supply reel and a lead tape attached to one end of a reel of recording tape wound on said supply reel, a device for detecting an accidental stoppage of the lead tape and for de-energizing the drive means, comprising:

a. means for detecting movement and stoppage of said lead tape and producing a first signal;
b. a spindle;
c. an arm pivoted at the intermediate thereof on said spindle and having at one end an arcuate portion, said arcuate portion transversing the passage of said lead tape;
d. a pair of make contacts adjacent the other end of said arm to provide a second signal; and
e. switching means selectively operated in a predetermined sequence in response to said first and second signals whereby said drive means is de-energized when said accidental stoppage of said lead tape is detected.

* * * * *